United States Patent [19]

Charlebois et al.

[11] Patent Number: 4,460,159

[45] Date of Patent: Jul. 17, 1984

[54] OPTICAL CABLE AND CABLE PULLING ATTACHMENT ASSEMBLIES

[75] Inventors: Leonard J. Charlebois, Kanata; Fred A. Huszarik, Ottawa, both of Canada

[73] Assignee: Northern Telecom Limited, Montreal, Canada

[21] Appl. No.: 309,976

[22] Filed: Oct. 9, 1981

[51] Int. Cl.³ .................. B65H 59/00; E21C 29/16; H02G 1/08

[52] U.S. Cl. .................. 254/134.3 R; 24/129 W; 29/517; 29/518; 29/460; 264/263; 350/96.15; 403/269

[58] Field of Search .................. 29/460, 517, 518; 350/96.15; 403/406, 275, 266, 267, 269; 264/263; 254/134.3 R, 134.3 ET, 134.5; 24/129 W

[56] References Cited

U.S. PATENT DOCUMENTS

| | | | |
|---|---|---|---|
| 2,284,042 | 5/1942 | Clark | 403/267 X |
| 2,338,524 | 1/1944 | McCabe | 264/263 |
| 2,629,921 | 3/1953 | Gray | 254/134.3 FT X |
| 2,750,152 | 6/1956 | Schinske | 254/134.3 FT |
| 3,102,715 | 9/1963 | Weitzel et al. | 254/134.3 FT |
| 3,133,725 | 5/1964 | Lanum | 254/134.3 R |
| 3,978,188 | 8/1976 | Schoenebeck | 403/269 X |
| 4,043,690 | 8/1977 | Browne | 29/460 X |
| 4,073,050 | 2/1978 | Kloats | 264/263 X |
| 4,103,410 | 8/1978 | Pennell | 29/460 X |
| 4,337,923 | 7/1982 | Smith | 254/134.3 FT |

FOREIGN PATENT DOCUMENTS 663781  5/1963  Canada ............ 254/134.3 FT

*Primary Examiner*—Charlie T. Moon
*Attorney, Agent, or Firm*—R. J. Austin

[57] ABSTRACT

An optical cable with an axial tensile strength member extending from one cable end beyond the cable jacket, and a pulling attachment secured to the extension of the strength member and does not seal directly around the cable jacket. A moulded plastic encapsulation encapsulates the cable end, an end portion of the jacket and the extension of the strength member to prevent fluid leakage between the exterior and interior of the cable.

3 Claims, 4 Drawing Figures

OPTICAL CABLE AND CABLE PULLING ATTACHMENT ASSEMBLIES

This invention relates to an optical cable and cable pulling attachment assemblies.

Pulling attachments are conventionally installed upon the ends of telecommunications cables to provide means for securing pulling mechanisms to the cables when these are to be unreeled. A pulling attachment is made as a metal fitting which is attached directly to an axially extending substantially inextensible strength member of a cable to enable the pulling loads to be conducted safety along the cable. In electrical transmission or power cables, a pulling attachment is secured directly to an electrical conducting core. In the case of optical cable, however, it is necessary to attach the pulling attachment to a strength member provided solely for the purpose of preventing or resisting extension of the cable under conditions of tension. Conventional pulling attachments also comprise parts which are sealed around the cable jacketing to prevent moisture ingress and to enable the cable to be pressurized internally.

Because of their structure to enable them to be attached and sealed to cable ends, pulling attachments are expensive items of manufacture.

The present invention provides an optical cable and cable pulling attachment assembly in which the attachment and its installation may be more economical than with conventional attachments and is suitable for use with optical cable.

Accordingly, the present invention provides an optical cable and cable pulling attachment assembly comprising a cable having an axially extending substantially inextensible tensile strength member and a cable jacket, the cable also having one end at which the strength member has an end portion projecting axially beyond an end of the cable, a pulling attachment secured at a region of connection to the axially projecting portion of the strength member, the pulling attachment devoid of any part which seals directly around the cable jacket, and a moulded plastic encapsulation which encapsulates the end of the cable, an end portion of the jacket and at least the part of the projecting portion closest to the cable end, the encapsulation providing a seal against fluid leakage between the exterior and interior of the cable.

In the above construction, the plastic material used clearly should be compatible with that forming the outer surface of the cable jacket so that a seal with the jacket is provided. Also, to strengthen the connection of the pulling attachment to the tensile strength member, it is preferred that the encapsulation has a certain rigidity and hardness to prevent relative movement of the attachment, strength member and the end portion of the cable jacket. In a case where the outer surface of the cable jacket is polyethylene, suitable mouldable materials for the encapsulation are ethylene acrylic acid, ionomer resin derived from ethylene/methacrylic acid copolymers such as sold under the trade name "Surlyn 1652" or "Surlyn 1702" by Du Pont, or an ethylene vinyl acetate. The injection temperature of all the above materials is above the softening temperature of the polyethylene so as to enable flow of one material into another and effect a bond. Another suitable material for the encapsulation is polyethylene which under injection temperatures effects softening or possibly melting of the surface areas of the cable jacket to form a bond.

Upon cooling after moulding, shrinkage of the encapsulant causes it to shrink onto the projecting end portion of the strengthening member and/or the pulling attachment to form a seal.

While the encapsulation may surround part of the projecting end portion of the strengthening member and leave the region of connection exposed, it is preferred that the region of connection is also encapsulated.

The invention also provides a method of making a cable and cable pulling attachment assembly comprising securing a pulling attachment at a region of connection to a projecting portion of a substantially inextensible tensile strength member extending from a cable end to transfer any tensile load from the pulling attachment to the strength member, and injection moulding a plastic encapsulation around the end of the cable, an end portion of the jacket and at least the part of the projecting portion closest to the cable end, the encapsulation forming a seal to prevent fluid leakage between the exterior and interior of the cable.

Embodiments of the invention will now be described, by way of example, with reference to the accompanying drawings in which.

Figure 1:
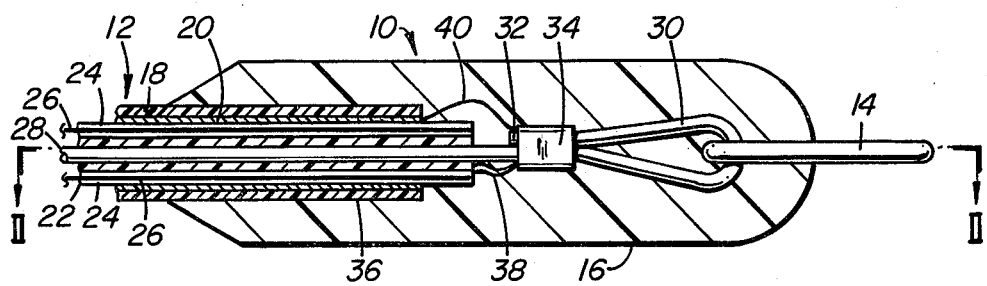
FIG. 1 is an axial cross-sectional view of a cable and pulling attachment assembly according to a first embodiment, at one end of a cable.
Figure 2:
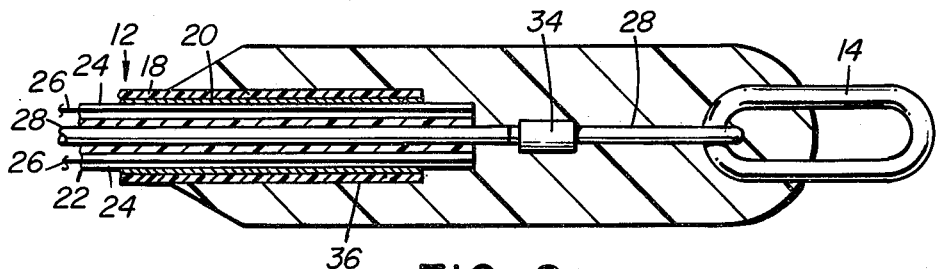
FIG. 2 is a cross-sectional view taken along line II-II in FIG. 1.

As shown in FIGS. 1 and 2, in a first embodiment, a cable and pulling attachment assembly 10 comprises an optical cable 12, pulling eye 14 and an encapsulation 16 formed from injection moulded ethylene acrylic acid.

The cable 12 comprises a polyethylene jacket 18 surrounding an aluminum sheath 20 which surrounds an extruded plastics core 22 formed with longitudinally extending grooves 24 housing optical waveguides 26. Coaxially within the core is disposed a steel tensile strength member 28.

An end portion of the strength member 28 projects axially beyond the end of the remainder of the cable and is formed as a loop 30 through the pulling eye 14 which is a simple flat sided steel ring. From the loop, the end portion of the strength member is turned back onto itself and has an end 32 lying alongside and contacting another part of the strength member. To hold the loop 30 closed, securing means is provided. This is a crimped ring 34 and is fastened around the two contacting parts of the strength member to secure them immovably together. A region of connection of the cable to the pulling eye is thus created which extends from and includes the crimped ring 34 and the whole of the loop 30 and its passage through the pulling eye. The securing means could alternatively comprise a screw-threaded clamp.

As shown in FIGS. 1 and 2, the encapsulation surrounds and embeds within itself the whole of the loop 30, and crimping ring and also a part of the pulling eye extending from the loop, to retain sufficient of the eye exposed at one end of the encapsulation to enable a hook to pass through it for unreeling. It is important that the encapsulation holds the embedded end of the pulling eye engaged with the bottom of the loop 30 whereby a tensile load is transmitted directly from the eye to the strength member without relative movement of the parts concerned.

The encapsulation also encapsulates an end portion 36 of the cable jacket. The encapsulation is sufficiently hard and rigid to substantially prevent relative movement of any of the elements which it covers under normally expected pulling or unreeling loads. For a cable diameter of 15 mm, an outside diameter for the encapsulant of 24 mm, has been found sufficient for this purpose. The encapsulation is sealed to all the surfaces which it is moulded around. It is bonded to the polyethylene at the surface regions of the jacket 18 and is in intimate sealing contact with the surfaces of the end portion of the strength member, the pulling eye and the crimped ring 34.

The cable is provided with at least two electrical telecommunications conductors 38. These extend from the cable end (FIG. 1), to be secured by the crimped ring 34 in electrical engagement with the strength member to enable an electrical current to be passed along the cable from the pulling eye. A ground wire 40 from the sheath 20 is also held within the crimped ring.

In use, it is known that the cable and pulling attachment assembly will withstand normal unreeling loads without suffering damage. Maximum pulling loads normally expected are around 700 lbs. However, it has been demonstrated that the assembly will withstand pulling loads up to 2200 lbs quite successfully. The material of the encapsulation clearly withstands the strain without permitting relative movement of the encapsulated parts.

The assembly described in the first embodiment thus is sufficiently strong for the purpose for which it is made. However, it is a relatively simple and cheap construction compared to the conventional metal fittings which are avoided.

To make the assembly of the first embodiment, after cutting back the cable to expose the projecting end portion of the strength member, the end portion is passed through the pulling eye, the loop 30 is formed and the ring 34 is crimped into place.

Figure 3:
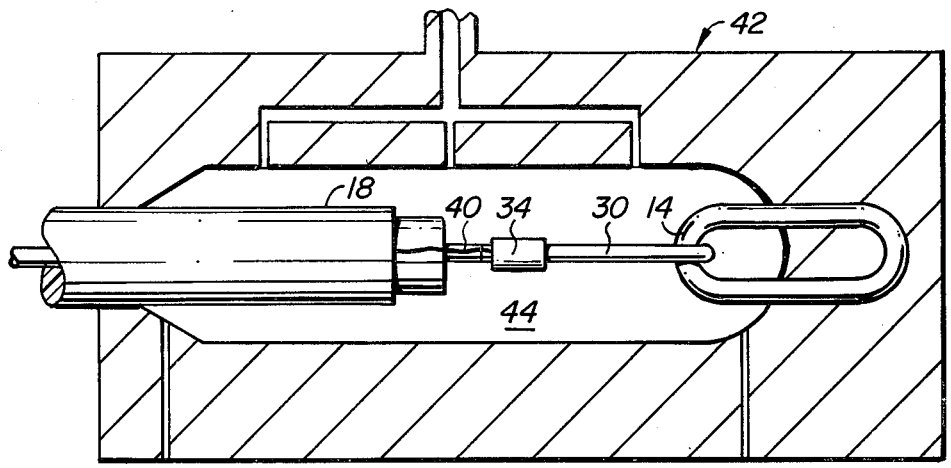
FIG. 3 is a view similar to FIG. 2 of one stage of making the assembly in a mould.

With the parts in their final desired position, this partial assembly is then installed in a mould 42 as shown in FIG. 3. As shown, the pulling eye is located within location grooves between the mould halves and is held against the bottom of the loop 30 during the injection process which is to follow. To ensure engagement between the loop bottom and the pulling eye, it may be necessary or prudent to apply a slight tensile load upon the cable which extends from the other end of the mould.

Molten ethylene acrylic acid is then injected into the mould cavity 44. The moulding temperature is such as to soften the polyethylene on the surface of the jacket 18 whereby flow of the material takes place to cause a bond and thus a seal between the jacket and the encapsulant. During cooling, the encapsulating material shrinks to grip the strength member, ring 34 and pulling eye so as to seal against their surfaces and hold them firmly against any movement in use.

Figure 4:
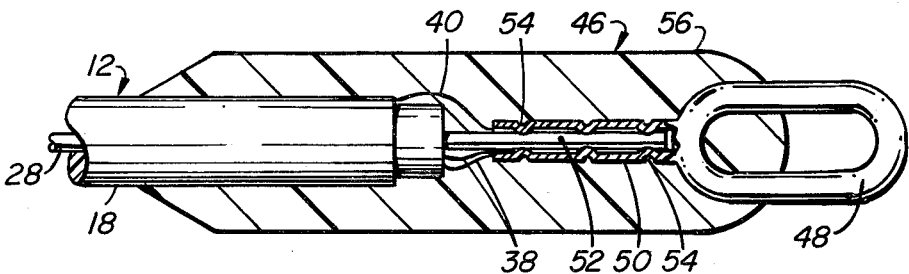
FIG. 4 is a view similar to FIG. 2 of a second embodiment.

In a second embodiment shown in FIG. 4, a cable and pulling eye assembly 46 comprises an optical cable 12 of similar construction to that of the first embodiment. The same reference numerals will therefore be used for this.

In the embodiment, the pulling eye 48 has an integral sleeve 50 extending from one end. This sleeve receives an axially extending end portion 52 of the strength member 28 and the sleeve is then crimped in spaced positions 54 (three positions being shown) to grip tightly onto the end portion. An encapsulant 56 surrounds an end portion 36 of jacket 18 and is bonded to the jacket to form a seal in the manner described in the first embodiment. The encapsulant also embeds within it a part of the eye and crimped sleeve 50 and the whole of the end portion 52 of the strength member.

The encapsulant which is injection moulded onto the cable end after the pulling eye is attached, shrinks into position during cooling to seal against the enclosed parts and to prevent their relative movement during unreeling. In fact, the encapsulant resists any tendency for the pulling eye to be pulled away from the strength member because opening of the crimps is resisted by the compressive force of the encapsulant and any hoop stresses involved in the encapsulant are satisfactorily absorbed.

What is claimed is:

1. An optical cable and cable pulling attachment assembly comprising:
    an optical cable having optical waveguides, a substantially inextensible tensile strength member extending axially along the cable length to provide tensile strength to the cable, and an exterior jacket, the cable also having one end at which the strength member has an end portion projecting axially beyond the end of the jacket;
    a pulling eye secured at a region of connection to the projecting portion of the strength member by the use of a sleeve which is disposed around the projecting portion of the strength member and has at least one crimp to grip the strength member, and the pulling eye devoid of any part which seals directly around the jacket; and
    a moulded plastic encapsulation which encapsulates the end of the cable, an end portion of the jacket, and at least the part of the projecting portion closest to the cable together with the region of connection and the crimped sleeve to prevent relative movement of the eye and strength member and to resist any tendency for the crimp to open under a tensile load, the encapsulation formed from a molten material having a moulded outer surface and providing a seal against fluid leakage between the exterior and interior of the cable.

2. An optical cable and cable pulling attachment assembly comprising:
    an optical cable having optical waveguides, a substantially inextensible tensile strength member extending axially along the cable length to provide tensile strength to the cable, and an exterior jacket, the cable also having one end at which the strength member has an end portion projecting axially beyond the end of the jacket;
    a pulling eye secured at a region of connection to the projection portion of the strength member which extends as a loop through the pulling eye and has a part turning back at the loop to lie alongside another part of the projecting portion, a sleeve surrounding the two parts and having at least one crimp to hold them immovably together, the pulling eye devoid of any part which seals directly with the jacket is engaged with the bottom of the loop to transmit a tensile load from the eye to the strength member; and
    a moulded plastic encapsulation which encapsulates the end of the cable, an end portion of the jacket, and at least the region of connection including the loop and the crimped sleeve to prevent relative movement of the eye and strength member and to resist any tendency for the crimp to open under a tensile load, the encapsulation formed from a molten material having a moulded outer surface and providing a seal against fluid leakage between the exterior and interior of the cable.

3. An optical cable and cable pulling attachment assembly comprising:

an optical cable having optical waveguides, a substantially inextensible tensile strength member extending axially along the cable length to provide tensile strength to the cable, and an exterior jacket, the cable also having one end at which the strength member has an end portion projecting axially beyond the end of the jacket;

a pulling eye having an integral sleeve secured at a region of connection to the projecting portion of the strength member which is received within the sleeve, the sleeve having at least one crimp which grips the strength member to transfer a tensile load to it from the eye, and the pulling eye devoid of any part which seals directly around the jacket; and a moulded plastic encapsulation which encapsulates the end of the cable, an end portion of the jacket, and at least the part of the projecting portion closest to the cable together with the crimped sleeve to prevent relative movement of the eye and strength member and to resist any tendency for the crimp to open under a tensile load, the encapsulation formed from a molten material having a moulded outer surface and providing a seal against fluid leakage between the exterior and interior of the cable.

* * * * *